US007455897B2

(12) United States Patent
Loukusa et al.

(10) Patent No.: US 7,455,897 B2
(45) Date of Patent: Nov. 25, 2008

(54) DIE LIP FOR STRIP COATING

(75) Inventors: Pentti K. Loukusa, Plymouth, MN (US); Kurt W. Oster, Oakdale, MN (US); Todd L. Peterson, Hugo, MN (US); Robert B. Secor, Stillwater, MN (US); Rebecca A. Shipman, Woodbury, MN (US); Merlin J. Steffen, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/933,760

(22) Filed: Sep. 3, 2004

(65) Prior Publication Data

US 2005/0025939 A1 Feb. 3, 2005

Related U.S. Application Data

(62) Division of application No. 10/278,963, filed on Oct. 23, 2002, now Pat. No. 6,803,076.

(60) Provisional application No. 60/372,922, filed on Apr. 16, 2002.

(51) Int. Cl.
*B32B 3/14* (2006.01)

(52) U.S. Cl. ........................ 428/77; 428/105; 428/40.1; 428/44; 427/286

(58) Field of Classification Search .................. 428/77, 428/44, 105, 40.1; 427/286
See application file for complete search history.

(56) References Cited

U.S. PATENT DOCUMENTS

| | | | |
|---|---|---|---|
| 3,496,012 | A | 2/1970 | Biorseth |
| 3,886,898 | A | 6/1975 | Colegrove et al. |
| 4,106,437 | A | 8/1978 | Bartlett |
| 4,167,914 | A | 9/1979 | Mladota |
| 4,324,816 | A | 4/1982 | Landis et al. |
| 4,386,998 | A | 6/1983 | McIntyre et al. |
| 4,391,856 | A | 7/1983 | McIntyre et al. |
| 4,465,015 | A | 8/1984 | Osta et al. |
| 4,899,691 | A | 2/1990 | Fitzgerald, Jr. et al. |
| 5,582,870 | A | 12/1996 | Shigesada et al. |
| 5,773,080 | A | 6/1998 | Simmons et al. |
| 5,871,585 | A | 2/1999 | Most et al. |
| 6,077,351 | A | 6/2000 | Herzog |

FOREIGN PATENT DOCUMENTS

WO WO 99/55790 11/1999

*Primary Examiner*—Jane Rhee
(74) *Attorney, Agent, or Firm*—Rick L. Franzen; James A. Baker

(57) ABSTRACT

The invention is a contact die for dispensing of flowable material on a substrate. The contact die includes at least one die block including a first internal passage. A die lip portion is disposed on the die block having a lateral dimension. A first plurality of orifices is disposed through the die lip portion proximate to each other and in communication with the internal passage to dispense flowable material as a single strip on the substrate. A first edge is disposed on one lateral side of the first plurality of orifices to direct the flowable material.

4 Claims, 10 Drawing Sheets

DIE LIP FOR STRIP COATING

CROSS-REFERENCE TO RELATED APPLICATIONS

This application is a divisional of U.S. application Ser. No. 10/278,963 filed on Oct. 23, 2002, now U.S. Pat. No. 6,803,076, which claims priority under 35 U.S.C. 119(e) from U.S. provisional application No. 60/372,922, filed Apr. 16, 2002.

TECHNICAL FIELD

The present invention relates to coating dies. More particularly, the present invention relates to coating strips of flowable material on a substrate.

BACKGROUND OF THE INVENTION

A variety of techniques are known for forming multiple strips of a composition onto a substrate. In those processes, a composition is applied to a web in the form a plurality of strips, each of which is separated from an adjacent strip by a region which is uncovered. One example of an extrusion type apparatus used in this type of process is described in U.S. Pat. No. 4,106,437, incorporated by reference herein. Extrusion type dies are disadvantaged in that as the composition is extruded onto the substrate, the composition can "neck down" or decrease in width and thickness between the exit of the die and the substrate. In certain applications, this method cannot generate sufficiently precise strip widths and thicknesses.

An alternate process for applying strips to substrate is contact coating type dies. In contact coating, the die is disposed close to the substrate so that "necking down" of the composition is eliminated. Thickness of the composition is adjusted by pulling the composition through a clearance between the substrate and an obstruction. When the end process involves dispensing relatively viscous material (e.g., greater than 1000 centipoise) the coating die can be subjected to high pressures which act to deform the structure of the die. A common required characteristic of the strips is a uniform cross-sectional profile. Deflection of the die can result in a non-uniform cross-sectional profile of the flowable material being coated onto the substrate. An additional requirement in certain applications is to maintain the edges of the strip of flowable material to a high level of precision (e.g., perpendicular to the substrate). Additionally, in some contact dies, as the substrate moves relative to the die, it is common for the substrate to wear on a portion of the die so that this portion would eventually require replacement. The rubbing of the substrate on the die can also cause a "necking down" of the web, potentially causing variation in strip width. This "necking down" can also affect the variety of substrates which can be used with the die.

Achieving a precise profile of the strip of flowable material along with precise edge definition as well as decreasing the amount of wear on the die are desirable improvements in strip coating technology. In particular, the uncoated portion of the substrate typically is the portion of the substrate which wears on the die. Thus, as the uncoated portion of the substrate increased, the wear of the substrate on the die increased, having the effect of limiting the percentage of uncoated substrate which can be manufactured due to the high wear of the die.

BRIEF SUMMARY OF THE INVENTION

The invention is a contact die for dispensing of flowable material on a substrate. The contact die includes at least one die block including a first internal passage. A die lip portion is disposed on the die block having a lateral dimension. A first plurality of orifices is disposed through the die lip portion proximate to each other and in communication with the internal passage to dispense flowable material as a single strip on the substrate. A first edge is disposed on one lateral side of the first plurality of orifices to direct the flowable material.

The die is used to dispose flowable material onto the substrate by translating the flowable material through the first internal passage in the die block. The flowable material is translated through the first array of orifices through the die lip and in communication with the first internal passage. The die lip has a lateral dimension. The flowable material is directed with the first edge. The first edge is proximate one lateral side of the first array of orifices. One edge of the first strip of flowable material on the substrate is defined with the first edge.

BRIEF DESCRIPTION OF THE DRAWINGS

In this disclosure, different embodiments of the invention are illustrated.

Throughout the drawings, like-reference numerals are used to indicate common features or components of the device.

While the above-identified drawing figures set forth different embodiments of the apparatus used in the invention, other embodiment were also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

Figure 1:
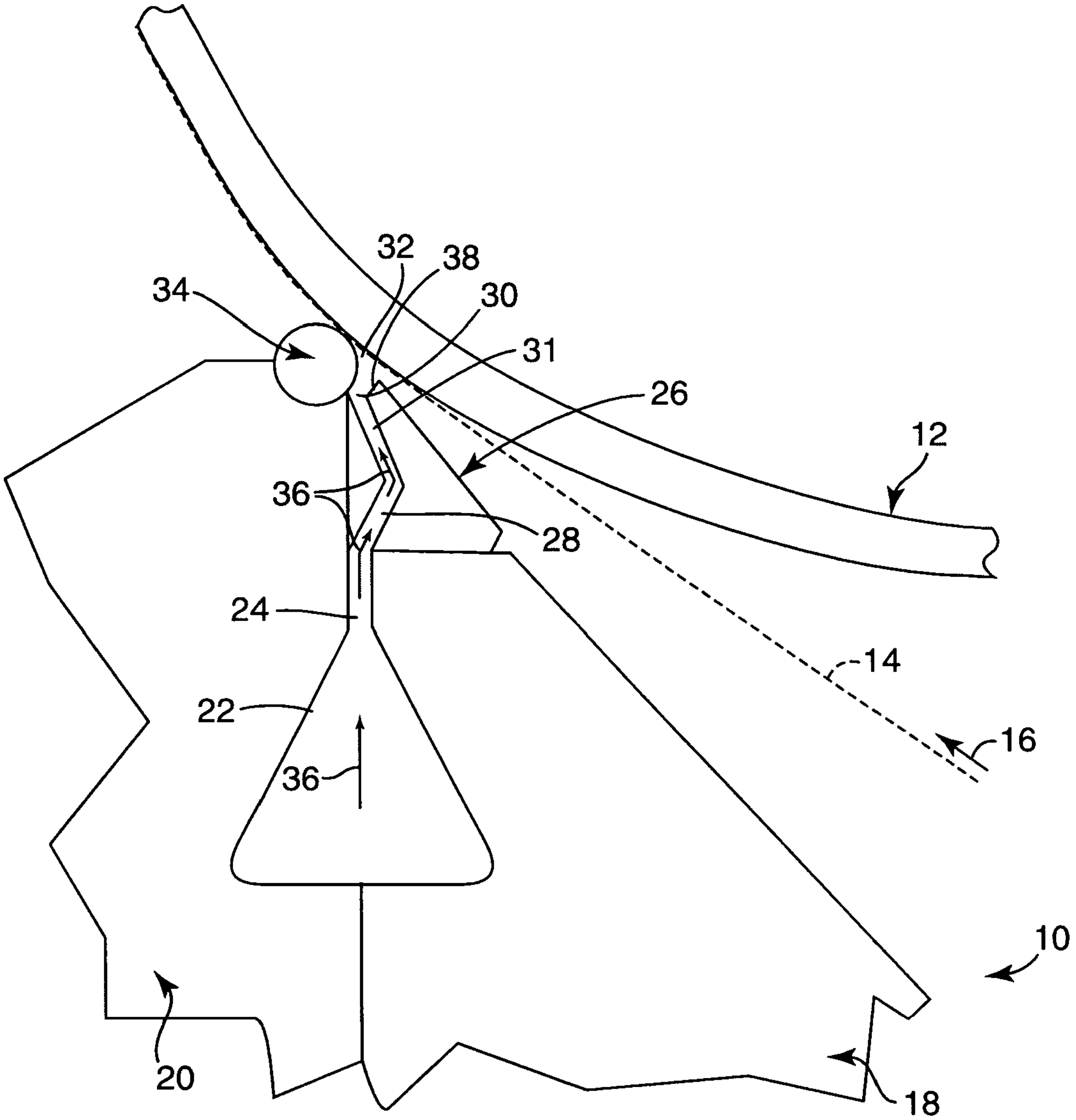
FIG. 1 is a schematic view of one embodiment of the inventive die.

A schematic partial view of the inventive contact die is shown at 10 in FIG. 1. Die 10 is illustrated in relation with roll 12 and substrate 14 (shown in dotted lines). In the embodiment illustrated, substrate 14 is typically a polymer web translating in the direction of arrow 16. It should be noted, however, that the invention can be used with almost any type of substrate or surface (e.g., paper, foil, cloth, glass, wood and metal, among others). Additionally, instead of the substrate translating past the die, the die may be translated over the substrate, depending upon the end application.

According to the present invention, the contact coating method generally involves a supported substrate. The supported substrate provides the normal force to the coating fluid necessary to thin it to the desired thickness. Non-limiting examples of a supported substrate include a roll or a belt. The skilled in the art are capable of selecting the appropriate support for a selected substrate and coating fluid to enable the contact coating of the substrate.

Die 10 includes a first die block 18, second die block 20, block manifold 22, internal passage 24, die lip 26, lip manifold 28, orifice 30, orifice chamber 31, tertiary manifold 32 and rod 34.

In contact coating, flowable material 36 (e.g., a liquid) reaches the desired thickness on substrate 14 by pulling the flowable material through a clearance between the substrate and an obstruction, which in this embodiment is rod 34, but which could be other structures including a die lip, knife, roller or blade, among others. The moving substrate provides the motive force to force the flowable material between the substrate and obstruction, whereas the obstruction serves to redirect excess liquid. The flow of the flowable material is characterized by a changing velocity across the clearance between the substrate and the obstruction. While the term "coating" is used to describe the flowable material on the substrate, "film" can also be used.

Flowable material (indicated by arrows 36) is forced into block manifold 22, or other means of distributing the flowable matter (such as a gear manifold or positive displacement pumps, among others) typically with an extruder or pump (not shown) as is known in the art. While contact die 10 is illustrated as having two main portions (first and second die block 18 and 20, respectively), it should be understood that almost any variation in contact die configuration (e.g., single block) is contemplated. Flowable material 36 is forced through internal passage 24 formed between first and second die blocks, 18 and 20, where it enters die lip 26. Flowable material 36 then enters lip manifold 28, which is in communication with internal passage 24. Lip manifold 28 provides an internal opening in die lip 26 which allows the flowable material inside the lip manifold 28 to equalize in pressure along the lateral dimension of die lip 26 (i.e., into the page of FIG. 1). Flowable material 36 then is forced through orifice chamber 31 and out of orifice 30 into tertiary manifold 32. Tertiary manifold 32 is disposed between output edge 38 of die lip 26 and rod 34. Tertiary manifold 32 is an area between die lip 26 and rod 34 downstream from orifice 30. Tertiary manifold 32 again allows flowable material 36 to equalize in pressure along the lateral dimension of die lip 26 (i.e., into the page of FIG. 1). Flowable material 36 is preferably dispensed from multiple orifices (discussed further with respect to FIGS. 2A and 2B). Flowable material 36 is directed onto substrate 14. Flowable material 36 and substrate 14 then pass between roll 12 and rod 34. As mentioned previously, this brings flowable material 36 to the proper thickness as well as smoothing flowable material 36 as is desirable in certain applications. As illustrated, substrate 14 preferably does not directly contact die lip 26, thereby preventing wear of die 10 and/or "necking down" of the substrate 14 due to minimizing friction caused by the translating substrate 14 over the die lip 26.

Inventive contact die 10 can utilize flowable material 36 comprising any material dispensable through a coating die. Examples of materials which can be coated onto the substrate include (but are not limited to): adhesives, melts, solutions and dispersions, among others.

Figure 2C:
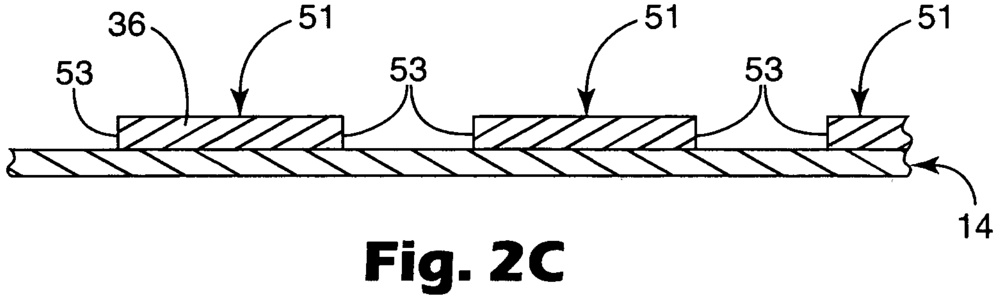
FIG. 2C is a cross-sectional view of one embodiment of strip coated substrate.
Figure 2:
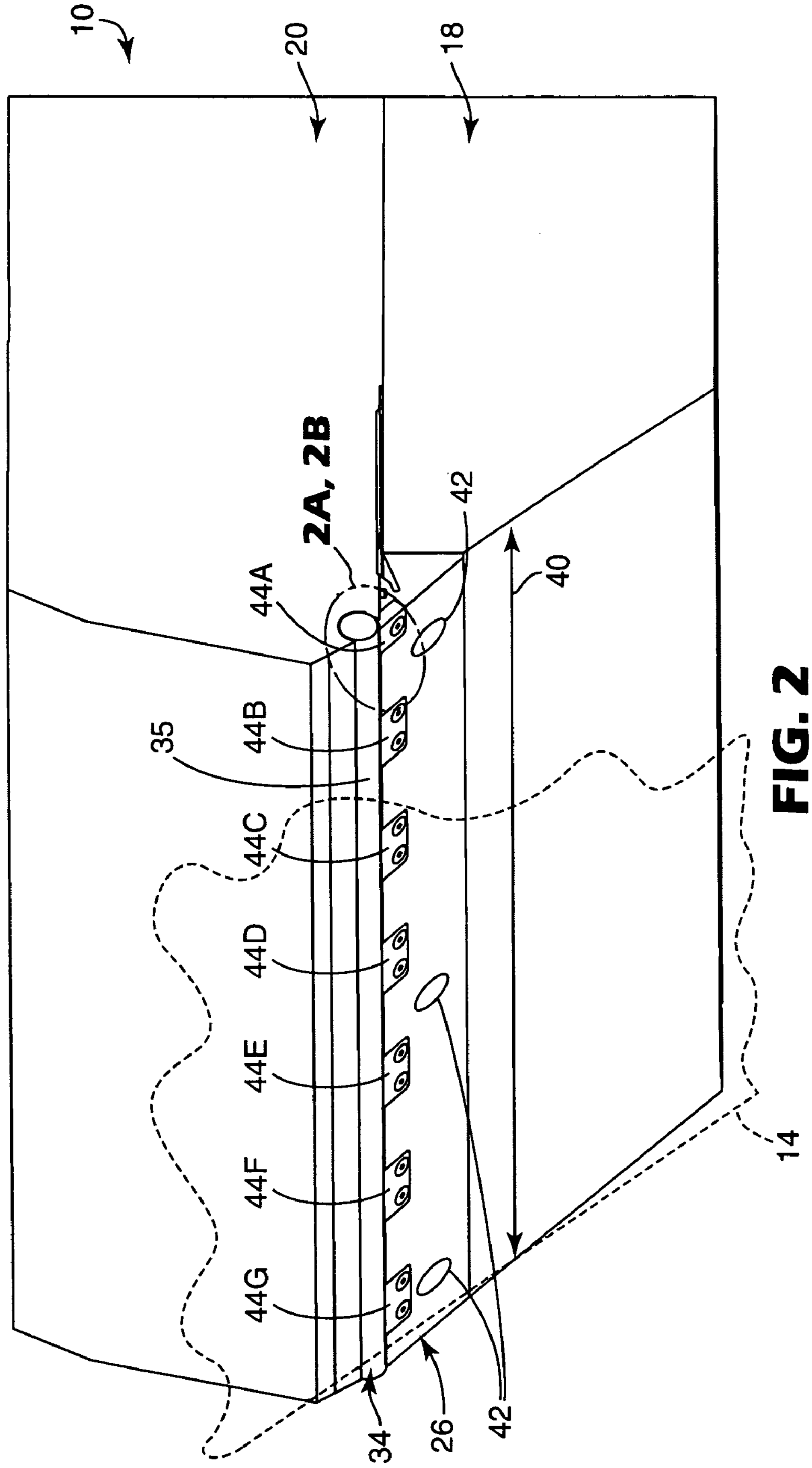
FIG. 2 is an isometric view of one embodiment of the die.

FIG. 2 illustrates a perspective view of one embodiment of the inventive contact die 10. In this view, lateral dimension 40 of die lip 26 is more clearly shown, as well as outer curved surface 35 of rod 34. Die lip 26 includes a plurality of bolt holes 42 used to secure die lip 26 to first die block 18. While three bolt holes 42 are illustrated, these are shown for exemplary purposes only. Any number of bolt holes 42 may be used to secure the die lip 26, or alternatively the die lip 26 can be integrally formed with the contact die 10 (e.g., with first die block 18). Thus, various die lip 26 embodiments can be removable or non-removable, depending upon the desired application.

Additionally, edge dams 44A-44G are illustrated as being attached to die lip 26. Edge dams 44 are used to define the coated and uncoated portion of substrate 14 (shown by dotted lines), which is discussed in further detail below. Edge dams 44 can be double-edge dams as shown by edge dams 44B-44G or half dams as shown by edge dam 44A. It should be noted that throughout the description, when specific elements are referred to out of a general element type, they will be referred to using an appended letter with the reference number (e.g., "edge dam 44A"). When the general element type is referred to, indicating characteristics similar to all the element types, no letter will be appended (e.g., "edge dam 44").

Figure 2A:
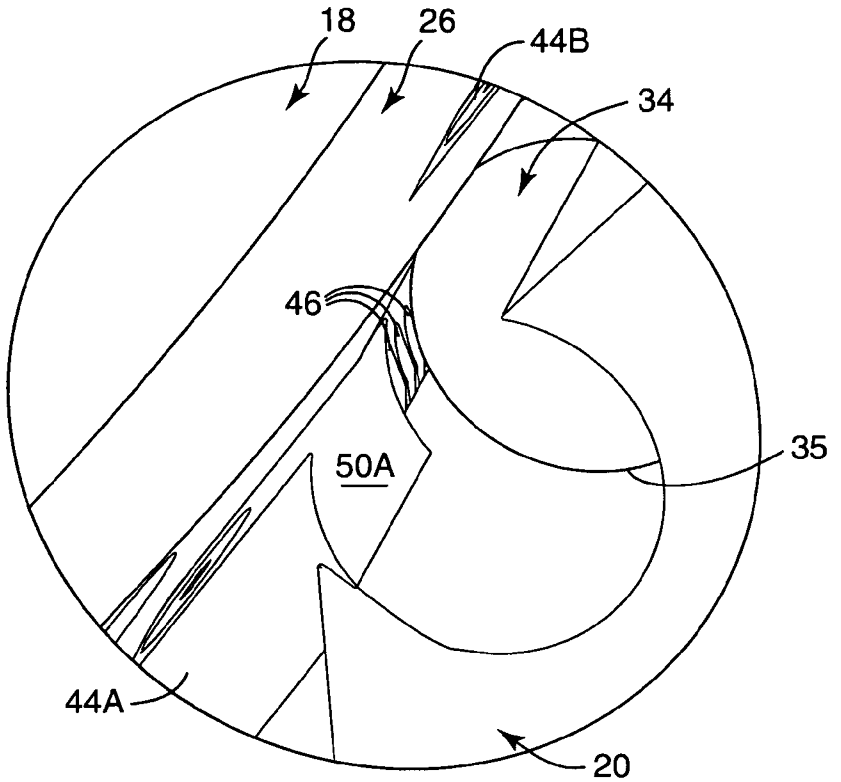
FIG. 2A is an isometric view of the area indicated by reference nos. 2A, 2B in FIG. 2 with the rod partially withdrawn.
Figure 2B:
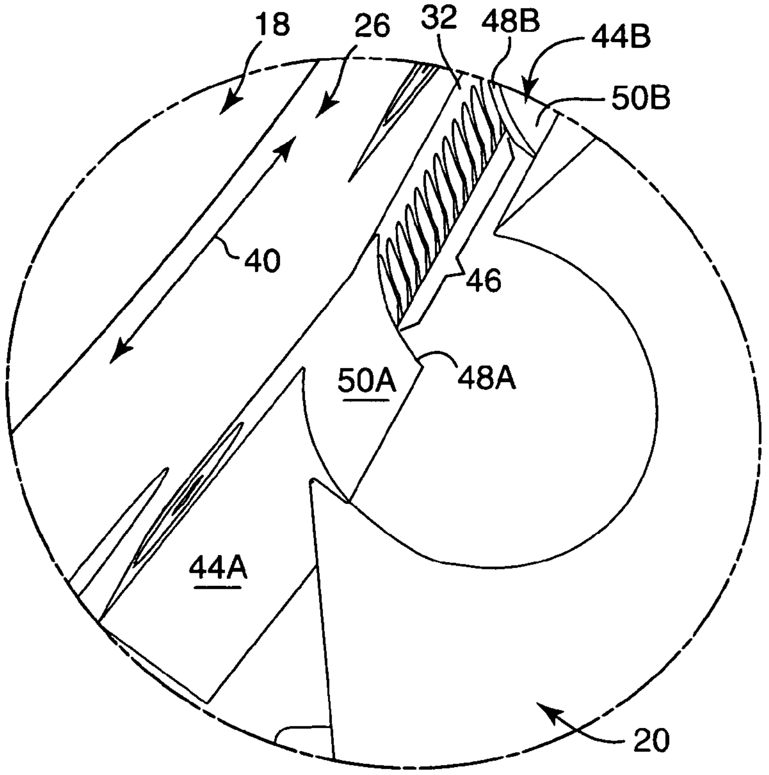
FIG. 2B is an isometric view of the area indicated by reference nos. 2A, 2B in FIG. 2 with the rod completely withdrawn.

FIGS. 2A and 2B illustrate a partial view of the die of FIG. 2. In FIG. 2A, rod 34 is partially retracted and in FIG. 2B, rod 34 has been removed, offering a view of a first plurality (or array) of orifices 46. The location of first plurality of orifices 46 corresponds to orifice 30 described and shown with respect to the schematic view of FIG. 1. Edge dam 44A, which is illustrated as a half edge dam, and edge dam 44B are also shown. Edge dams 44A and 44B each have a directing edge 48A and 48B, respectively, disposed on both lateral sides of the plurality of orifices 46 (along lateral dimension 40 of die lip 26).

Directing edges 48A and 48B direct flowable material dispensed through first plurality of orifices 46 before it passes onto substrate 14 and between rod 34 and roll 12 (see FIGS. 1 and 2). Directing edges 48A and 48B thereby precisely form edges on strips of flowable material 36 dispensed onto substrate 14. Varying the angle at which directing edges 48 are disposed allows the shape of the edge of the flowable material to be changed according to the end application.

Additionally, edge dams 44 also include rod faces 50 as illustrated by rod faces 50A and 50B for edge dams 44A and 44B, respectively. It is preferable that all rod faces 50 are disposed proximate to and have a shape conforming to outer curved surface 35 of rod 34. Most preferably, rod 34 and rod faces 50 are in such close proximity that flowable material is prevented from extending between rod face 50 and rod 34 while gas is allowed to escape therebetween. Preventing the spread of flowable material in this manner assures that the strip of flowable material is accurately positioned on the substrate.

One method for assuring tight tolerance in a die utilizing a rotating rod design (known in the art) is to machine the rod faces 50 so as to slightly engage rod 34. By forming either rod 34 or edge dams 44 out of material that have differing hardnesses (i.e., edge dams 44 harder than rod 34, or rod 34 harder than edge dams 44) a slight wearing of either rod faces 50 or outer curved surface 35 of rod 34 will occur as rod rotates during operation of the die, assuring minimal clearance between the two elements. Additionally, it is preferable that edge dams 44 are formed of a material harder than the substrate, so that any contact between substrate and edge dams 44 does not prematurely wear edge dams 44.

It should be understood that edge dams can be manufactured such that various portions of edge dams are constructed of different materials (e.g., directing edges 48 formed of a different material than the remainder of edge dams 44). The clearance between the rod 34 and rod face 50 can vary according to the viscosity of the flowable material being dispensed, and the pressure at which the die is operating. For example, a more viscous material dispensed at lower pressure will allow for more clearance than a less viscous material dispensed at a higher pressure. The viscosity and pressure will vary according to the end application for which the contact die is used.

The use of multiple orifices disposed immediately proximate each other and between directing edges allows high pressures and viscosities to be used with inventive die 10 without causing bowing or distortion of die lip 26, as previously could occur using lateral slots. Multiple orifices increase the structural integrity of die lip 26. By preventing distortion of the portion of the die lip where flowable material is dispensed, the cross-sectional profile of the flowable material coated on the substrate is precisely maintained (i.e., minimal variation in thickness).

FIG. 2C illustrates a partial cross-sectional view of one embodiment of substrate 14 having strips 51 of flowable material 36 coated thereto by the inventive die. As mentioned and shown previously, directing edges 48 or die 10 form precisely shaped edges 53 of each strip 51. Edges 53 are preferably substantially perpendicular to substrate 14 (although other angles are contemplated). The precise formation of edges 53 is required in certain applications. Most preferably, the cross-sectional profile of the flowable material on the substrate is uniform and is within plus or minus 5 percent variance along the cross-sectional profile. Most preferably, the cross-sectional profile is within plus or minus 1 percent variance.

Figure 3A:
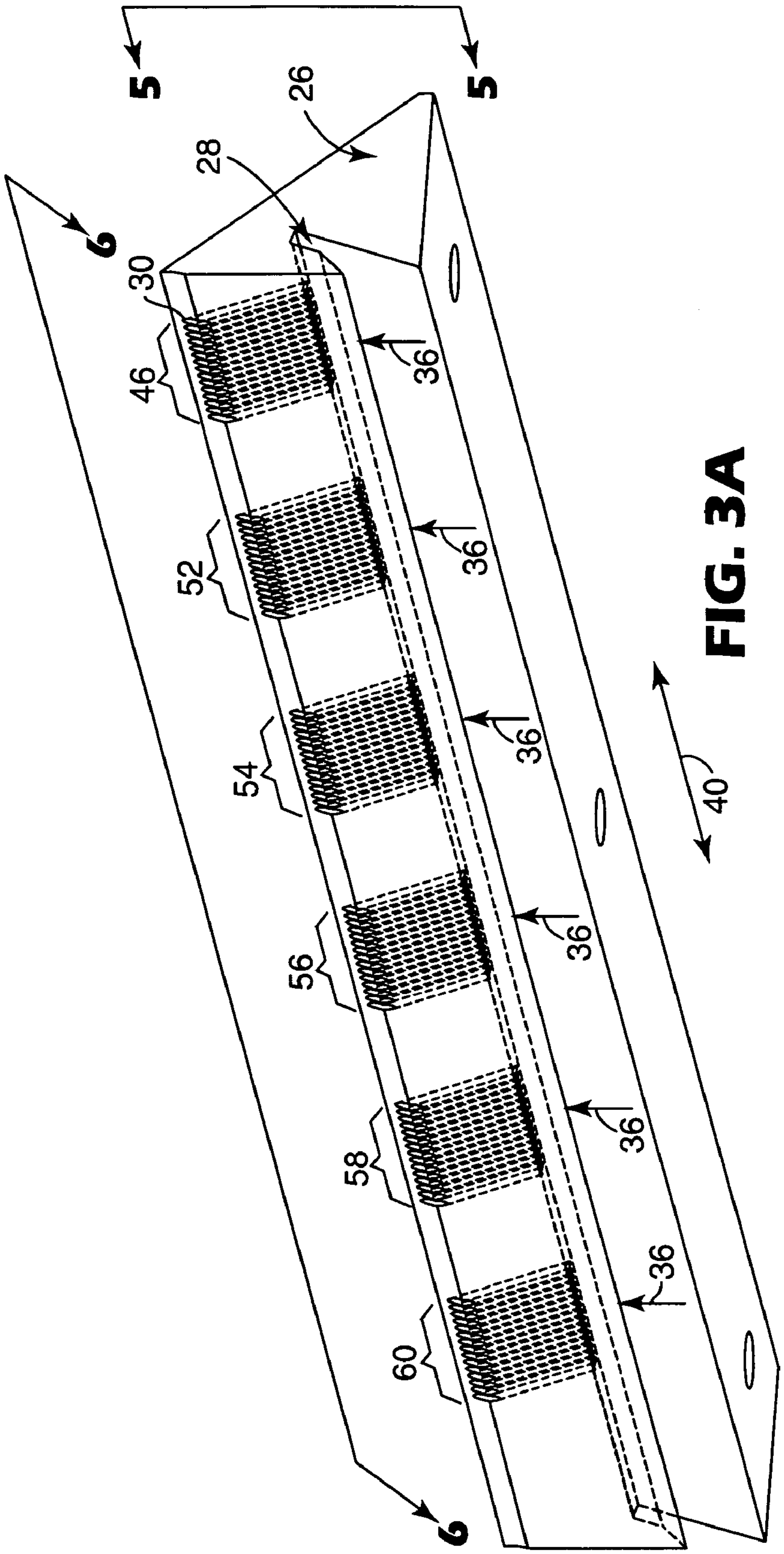
FIG. 3A is an isometric view of one embodiment of the inventive die lip.

FIG. 3A illustrates an embodiment of die lip 26 with the edge dams removed. Along with first plurality of orifices 46, second, third, fourth, fifth and sixth plurality (or arrays) of orifices (52, 54, 56, 58 and 60, respectively) are illustrated. Flowable material 36 dispensed by each plurality of orifices 46, 52, 54, 56, 58 and 60 merges to form each strip of flowable material 36 dispensed on the substrate. While six arrays are illustrated, any number of arrays can be used without departing from the scope of the invention. Additionally, while fifteen individual, similarly shaped and sized orifices 30 make up each respective array 46, 52, 54, 56, 58 and 60, any number or shape orifice 30 can be used as described in PCT Publication No. WO99/55790, incorporated by reference in its entirety herein. In the most preferred embodiment, orifices have a diameter of between 0.06 inch (1.5 mm) to 0.02 inch (0.5 mm). Similarly, the number, size and shape can vary from array-to-array and within each array. Additionally, while each array is illustrated as having individual orifices 30 aligned along the lateral dimension 40 of the die lip 26, any orientation can be used without departing from the scope of the invention. Those skilled in the art are capable of selecting orifice patterns and orifice shapes based on desired characteristics to achieve a strip thickness and width.

As previously described, flowable material 36 is forced into lip manifold 28. In the embodiment illustrated, lip manifold 28 extends the full lateral dimension 40 of die lip 26. Thus, one internal passage 24 in the die block can be used to feed flowable material 36 to the lip manifold 28 and through each array of orifices (46, 52, 54, 56, 58 and 60).

Figure 3B:
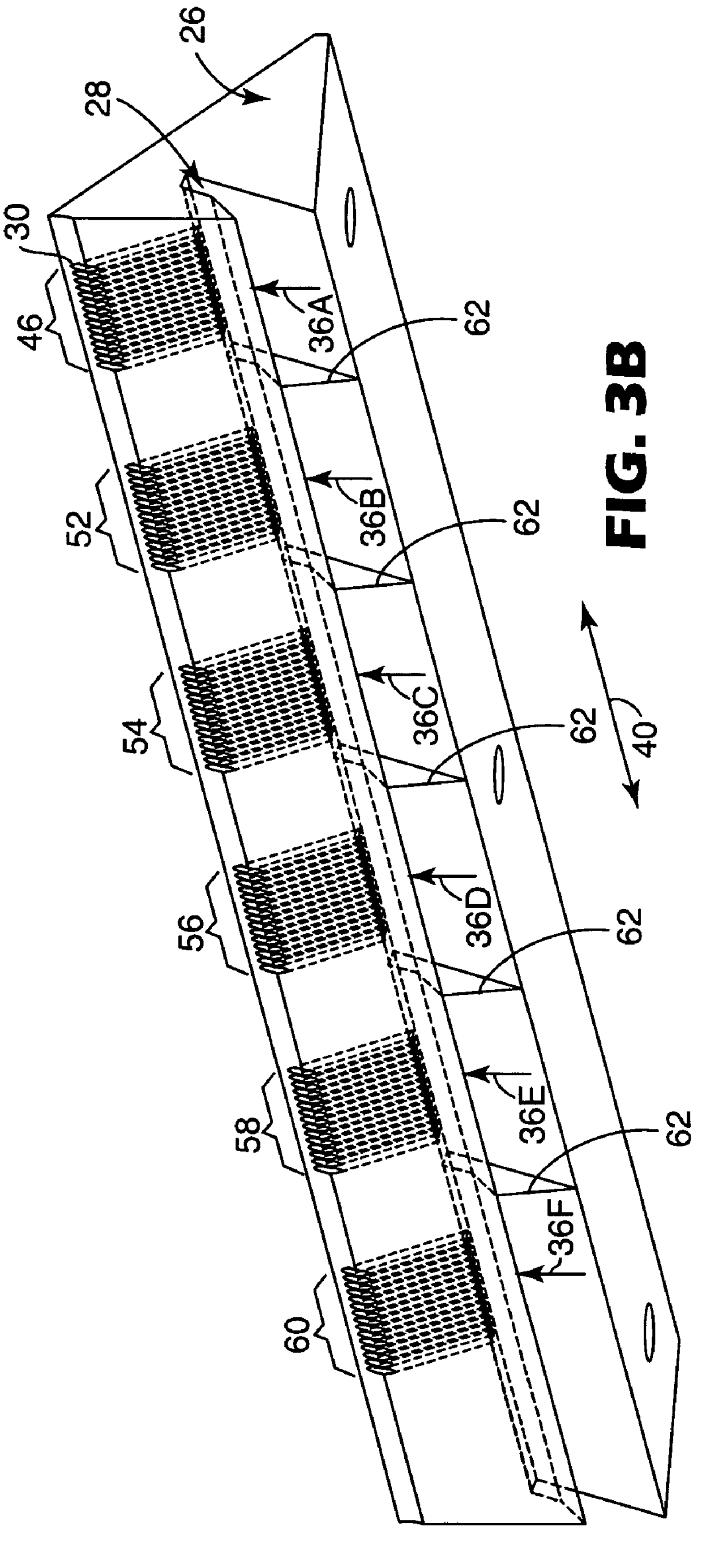
FIG. 3B is an isometric view of an alternate embodiment of the inventive die lip.

In an alternate embodiment shown in FIG. 3B, each array can be separated from an adjacent array using dividers 62. In this manner, different internal passages in the contact die 10 can be in communication with different arrays, allowing different flowable materials 36A-36F to be dispensed on the substrate. Note that any mix of various flowable materials could be used. For example, instead of six different materials, two internal passages can be utilized to dispense two different materials, alternating between arrays.

Alternatively, six internal passages could be in individual communication with each array, but the same flowable material forced through each array of orifices.

Figure 4:
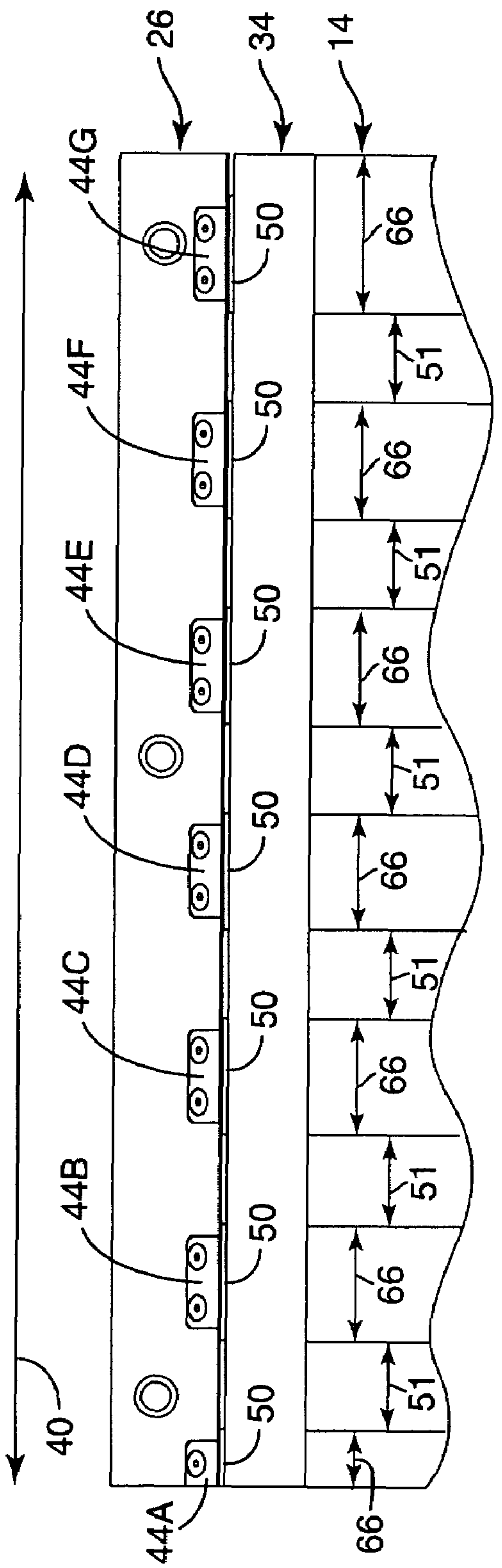
FIG. 4 is a schematic view of the inventive die lip portion, rod and coated substrate.

As illustrated in FIG. 4, once substrate 14 passes die lip 26 and rod 34, edge dams 44 act to direct flowable material 36 into strips (or covered areas) 51 on substrate 14. The lateral length of the rod face 50 portion of edge dam 44 between the distributed flowable material 36 prevents flowable material 36 from coating substrate 14. Thus, various covered areas 51 and uncovered areas 66 can be defined on substrate 14. While six covered areas 51 are illustrated all having approximately the same width (i.e., any lateral dimension 40), die lip 26 can be configured to coat coated areas 51 at any width and at any number. Preferably, the sum of coated areas 51 comprises less than 65 percent and most preferably 35 percent or less of the total area of substrate 14 passing under die lip 26.

Using removable die lips 26 (discussed previously) allows for efficiently changing the width and/or number of coated areas by changing from one die lip to a second die lip having a different array and edge configuration.

Figure 5:
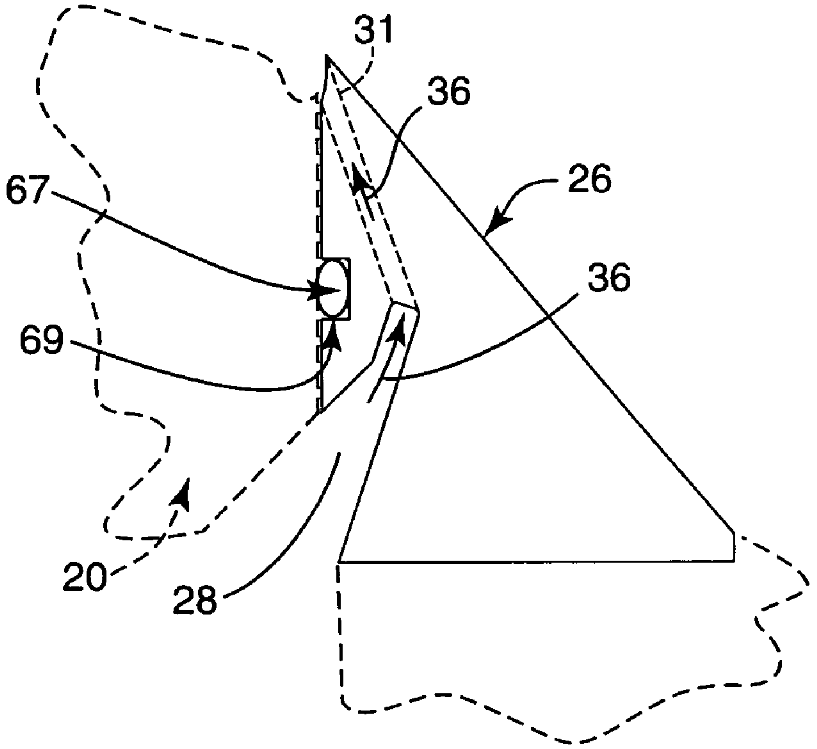
FIG. 5 is an elevational end view of one embodiment of the inventive die lip portion as taken along lines 5-5 of FIG. 3.

FIG. 5 illustrates an elevational view of one embodiment of die lip 26 as taken along line 5-5 of FIG. 3A. In one preferred embodiment of die lip 26, O-ring 67 is disposed in groove 69, formed into die lip 26. O-ring 67 and groove 69 extend laterally along the lateral dimension of die lip 26 (i.e., into the page for FIG. 5). O-ring 67 provides a seal between die lip 26 and second die block 20 (shown in dotted lines), preventing flowable material 36 from extending between the mating faces of die lip 26 and second die block 20.

It should also be noted that in one embodiment, lip manifold 28 extends into die lip 26 such that lip manifold 28 is formed completely within die lip 26 (a single piece of material). This minimizes the distortion of the die lip 26. Minimizing distortion of the die lip 26 helps to assure a continuous cross-section of flowable material 36 is coated on the substrate.

Figure 6:
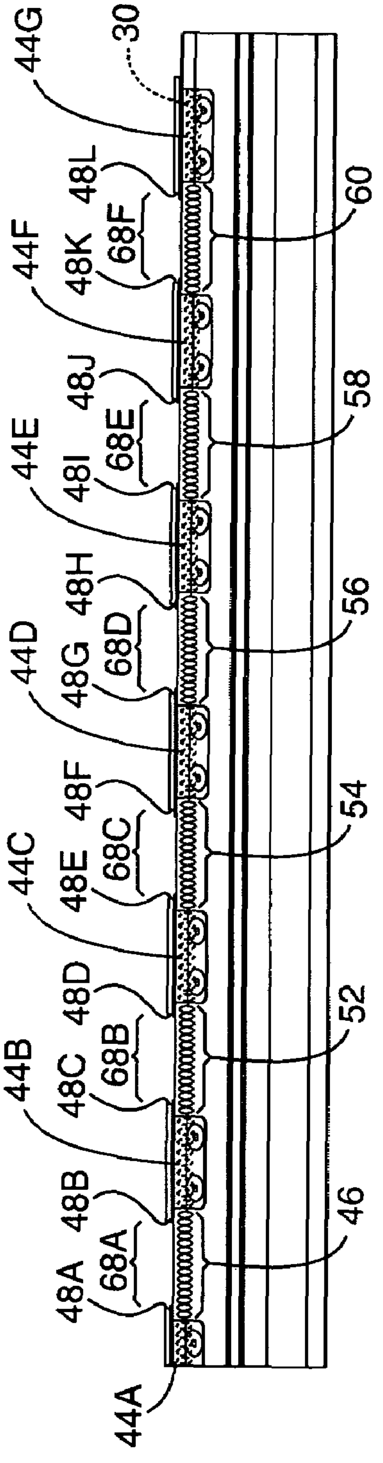
FIG. 6 is a view of the inventive die lip portion as taken along lines 6-6 of FIG. 3A, with edge dams included.

The embodiment illustrated in FIG. 6 is taken in the direction of line 6-6 of FIG. 3A, and includes edge dams 44. As can be seen in FIG. 6, the relationship between each array of orifices 46, 52, 54, 56, 58 and 60 and edge dams 44 is such that each array and adjoining edge dams 44 form six coating (or working) sections, section 68A, section 68B, section 68C, section 68D, section 68E and section 68F. These coating sections 68 define the width of each strip of flowable material 36 coated on substrate 14 (and therefore the width of each uncovered area 66, discussed with respect to FIG. 4). The width of each section 68 can be varied individually as appropriate for the end application.

Section 68A includes first array 46 and first and second directing edge 48A and 48B, as described previously with respect to FIGS. 2A and 2B. Similarly, section 68B includes second array 52 and third and fourth directing edges 48C and 48D. Section 68C includes third array 54 and fifth and sixth directing edges 48E and 48F. Section 68D includes fourth array 56 and seventh and eighth directing edges 48G and 48H. Section 68E includes fifth array 58 and ninth and tenth directing edges 48I and 48J. Section 68F includes sixth array 60 and eleventh and twelfth directing edges 48K and 48L.

In one embodiment of the inventive die lip 26, orifices may extend across most of the lateral length of the die lip 26, as indicated by orifices 30 shown in dotted lines. Edge dams 44B-44G can be placed as indicated to block certain orifices which directs the flowable material through the unblocked orifices. Additionally, orifices may be partially blocked, depending upon the end application, and desired strip widths.

Figure 7:
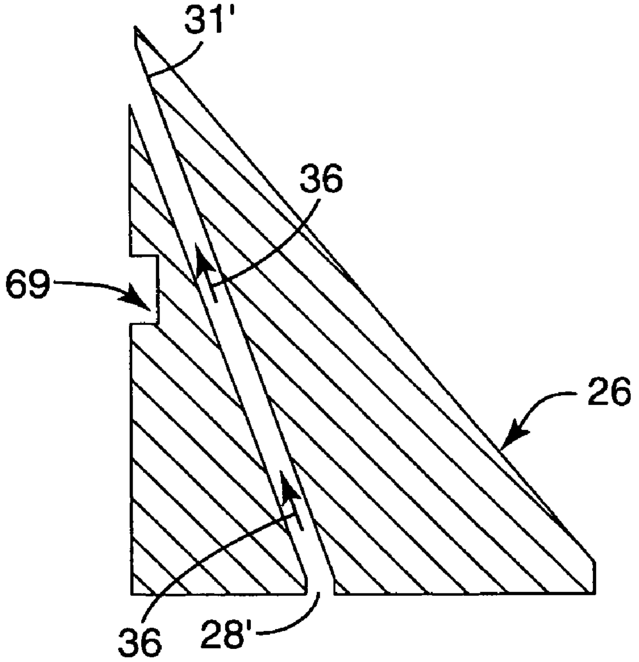
FIG. 7 is a cross-sectional view of an alternate embodiment of the inventive die lip portion.

FIG. 7 is an alternate embodiment of die lip 26 seen in a cross-section. The configuration of these passages (i.e., lip manifold 28' and orifice chamber 31') can vary according to the configuration of internal passage 24 in first die block 18 (discussed and illustrated in FIG. 1), coating material (i.e., flowable material 36) among other reasons. It should also be understood that while a 60 degree die lip 26 is illustrated, other die lip configurations (e.g., 40 degree) can be utilized without departing from the spirit and scope of the invention.

FIGS. 8, 9, 10 and 11 illustrate one embodiment of edge dams 44. As mentioned previously, edge dam 44A (shown in FIGS. 8 and 9) is a single-edge dam, meaning only one directing edge 48A is disposed on edge dam 44A. Thus, the single-edge dam is preferably disposed next to only one array of orifices and not between two arrays (since only one directing edge is provided). Edge dam 44B, on the other hand, is a double-edge dam, having two directing edges 48B and 48C, allowing it to be placed between two arrays of orifices.

Figure 8:
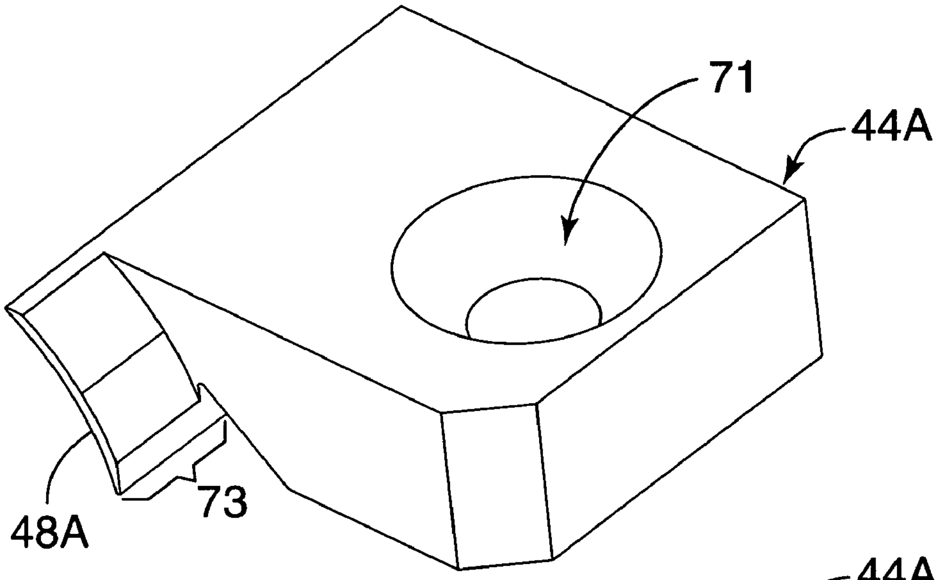
FIG. 8 is a perspective view of one embodiment of a single-edge dam for the inventive die.
Figure 8A:
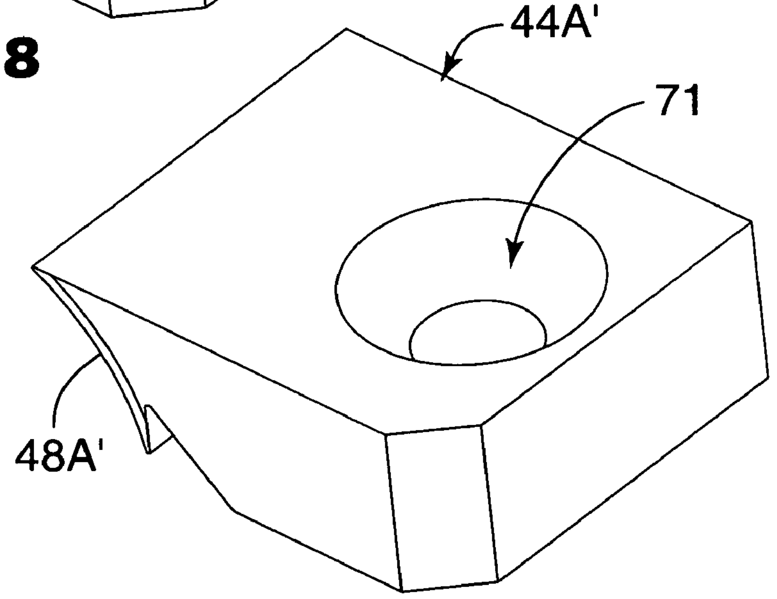
FIG. 8A is a perspective view of an alternate embodiment of a single-edge dam for the inventive die.
Figure 9:
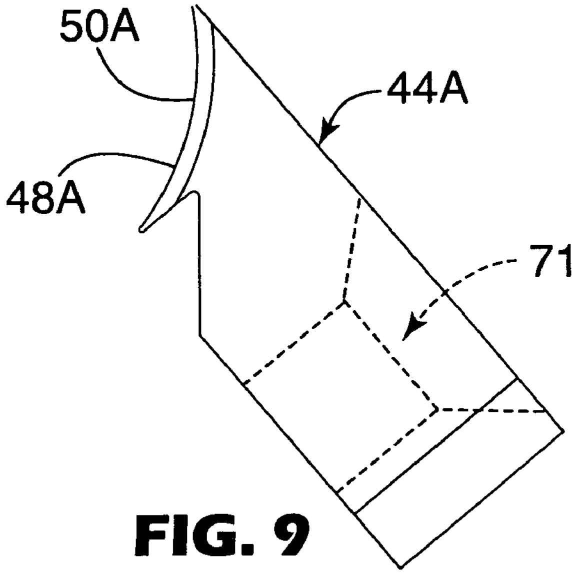
FIG. 9 is an elevational view of the single-edge dam illustrated in FIG. 8.
Figure 10:
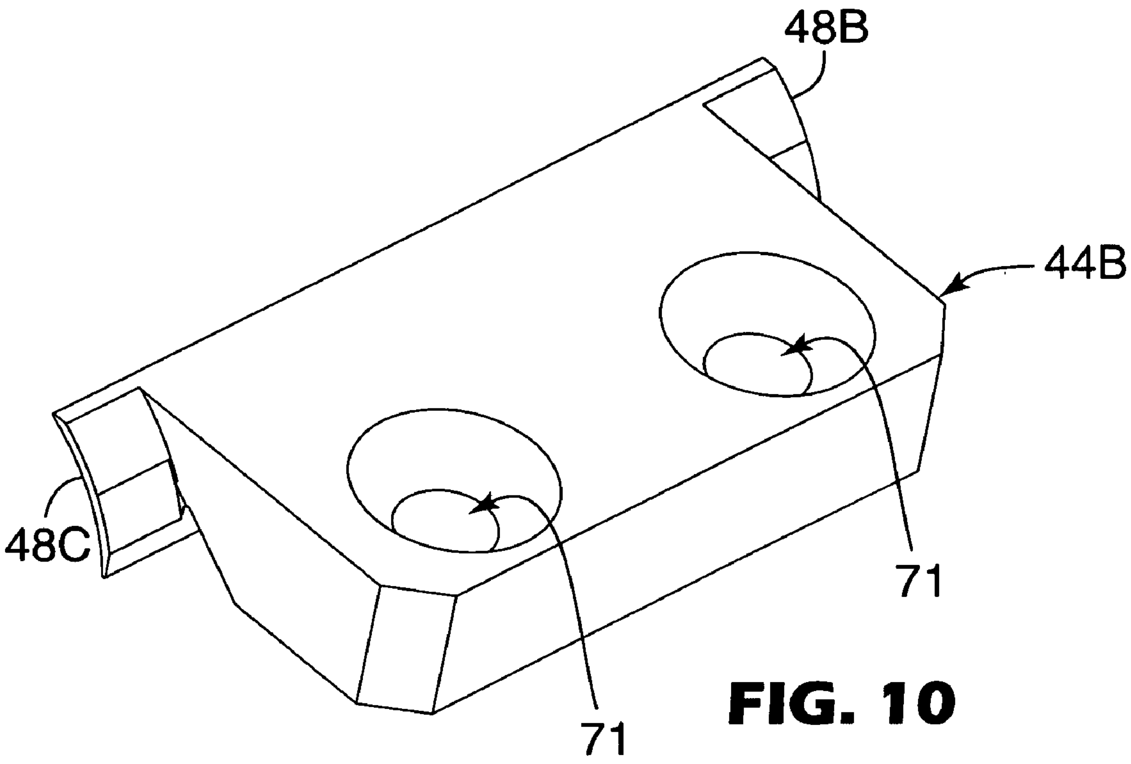
FIG. 10 is a perspective view of a double-edge dam of the inventive die.
Figure 11:
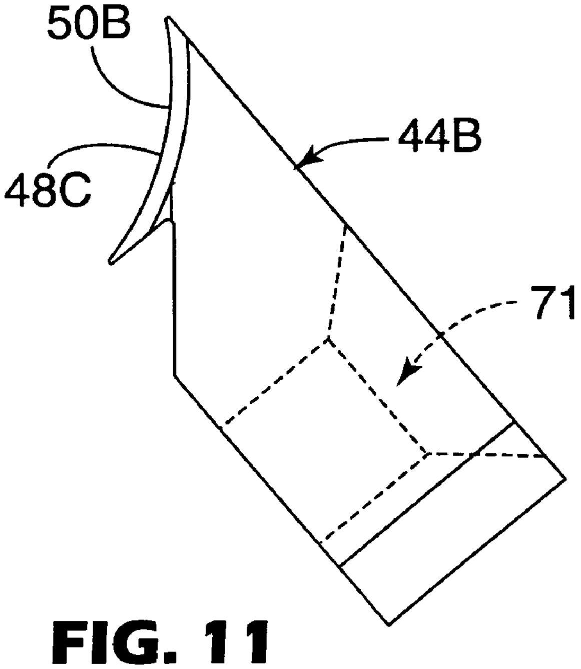
FIG. 11 is an elevational view of the full die shown in FIG. 10.

While each edge dam 44 is illustrated as a separate element which is bolted to die lip 26 through bolt hole 71 (see FIG. 6), other ways of forming directing edges 48 are also contemplated by the current invention. For example, one or all of the edge dams 44 can be integrally formed with die lip 26. Directing edge 48A can be formed on wing 73 extending from edge dam 44. Wing 73 may be used to block some of orifices 30 (as described with respect to FIG. 6). Alternatively, a person skilled in the art would understand that edge dams 44 can be constructed without wing 73, as illustrated in FIG. 8A. As is best illustrated by FIGS. 9 and 11, rod face 50A has a curvature, which is designed to substantially conform to outer surface 35 of annular rod 34 (shown in FIGS. 2 and 2A). While edge dams 44 may be formed of various materials, preferably they are formed of bronze so as to provide soft wear material against a harder rod material (such as case hardened steel). As previously discussed, other materials for edge dams 44, and particularly for directing edges 48 and rod faces 50, are contemplated by the invention, and can be chosen such that outer surface 35 of rod 34 is harder than edge dams 44, or vice versa.

Figure 12:
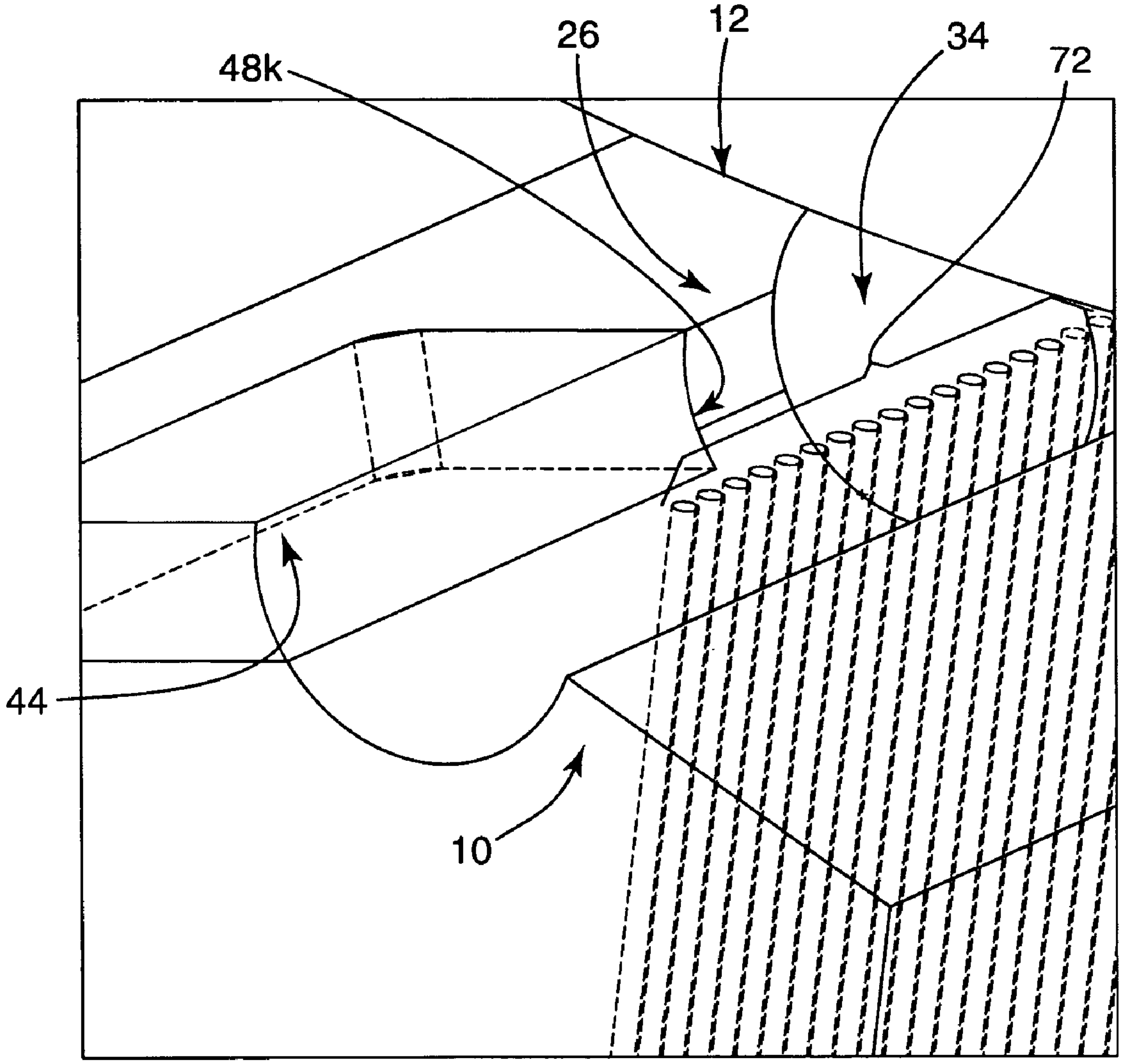
FIG. 12 is schematic view of an alternate embodiment of the inventive die.

As mentioned, other methods of forming directing edges 48 into contact die 10 are contemplated by the invention. FIG. 12 is a schematic view illustrating an alternate embodiment of contact die 10. Rod 34 and roll 12 are illustrated in relation to die 10, with rod 34 slightly retracted to afford a view of a seventh plurality (or array) of orifices 72. In this instance, die lip 26 is formed integrally with die 10. Additionally, directing edge 48K is formed directly into die lip 26.

The configuration described provides a coating die which decreases the contact between the substrate and the die over previous methods while providing the capability of coating multiple strips, each strip having cross-sectional edges maintained and a high degree of cross-sectional thickness uniformity, onto a substrate.

Although the present invention has been described with reference to preferred embodiments, workers skilled in the art will recognize that changes may be made in form and detail without departing from the spirit and scope of the invention.

The invention claimed is:

1. A contact die-coated substrate comprising:
a first planar side;
at least three strips of a flowable material, wherein each strip consists essentially of compositionally the same flowable material and has a substantially constant cross-sectional profile and edges substantially perpendicular to the substrate disposed on the first planar side, wherein each strip of flowable material has less than a 5 percent variance across the cross-sectional profile; and
wherein less than 65 percent of the substrate is covered by the at least three strips of the flowable material.

2. The contact die-coated substrate of claim 1, wherein the substrate and each strip of the flowable material each exhibit a thickness in a direction substantially perpendicular to the substrate disposed on the first planar side, and wherein each strip thickness is at least as large as the substrate thickness.

3. The contact die-coated substrate of claim 1, wherein each strip of the flowable material exhibits a width defined between the edges of the each strip, and wherein the width of each strip of the flowable material is greater than a distance between an edge of each strip and an edge of an adjacent strip of the flowable material.

4. A coated substrate comprising:
a substrate having a first planar side;
at least three rectangular three dimensional strips of flowable material applied to the substrate on the first planar side, each strip having a substantially constant rectangular cross-sectional profile and edges substantially perpendicular to the substrate disposed on the first planar side, wherein each strip has less than a 5 percent variance across the rectangular cross-sectional profile; and
wherein no more than 35 percent of the substrate is covered by the at least three strips.

* * * * *